US006340381B1

(12) United States Patent
Fujii et al.

(10) Patent No.: US 6,340,381 B1
(45) Date of Patent: Jan. 22, 2002

(54) METHOD AND APPARATUS FOR THE PREPARATION OF CLEAN GASES

(75) Inventors: Toshiaki Fujii; Tsukuru Suzuki; Hidetomo Suzuki, all of Kanagawa-ken; Kazuhiko Sakamoto, Saitama-ken, all of (JP)

(73) Assignee: Ebara Research Co., Ltd., Fujisawa (JP)

( * ) Notice: Subject to any disclaimer, the term of this patent is extended or adjusted under 35 U.S.C. 154(b) by 0 days.

(21) Appl. No.: 09/620,247

(22) Filed: Jul. 20, 2000

Related U.S. Application Data

(63) Continuation of application No. 08/424,545, filed as application No. PCT/JP92/01579 on Dec. 2, 1992.

(30) Foreign Application Priority Data

Dec. 2, 1991 (JP) .............................. 3-341802
Jun. 16, 1992 (JP) .............................. 4-180538

(51) Int. Cl.$^7$ .............................................. B01D 53/04
(52) U.S. Cl. .................. 95/63; 95/118; 95/129; 95/137; 95/143; 95/287; 96/52; 96/55; 96/134; 55/385.2
(58) Field of Search .................... 55/385.1, 385.2; 95/63, 68–70, 90, 117–122, 129, 137, 143, 273, 286, 287; 96/52, 55, 108, 134–136, 139–142

(56) References Cited

U.S. PATENT DOCUMENTS

| 4,000,990 A | * | 1/1977 | Bingham ................... 95/121 X |
| 4,153,429 A | * | 5/1979 | Matthews et al. ............ 95/117 |
| 4,231,768 A | * | 11/1980 | Seibert et al. ................ 55/179 |
| 4,629,479 A | * | 12/1986 | Cantoni ........................ 96/55 |
| 4,655,049 A | * | 4/1987 | Andrews et al. .......... 96/135 X |
| 4,741,882 A | * | 5/1988 | Weichselgartner .......... 422/122 |
| 5,039,321 A | * | 8/1991 | Satoh et al. .............. 96/136 X |
| 5,042,997 A | * | 8/1991 | Rhodes ................... 55/385.2 X |
| 5,080,699 A | * | 1/1992 | Ho et al. ............... 55/385.1 X |
| 5,221,520 A | * | 6/1993 | Cornwell .................. 95/117 X |
| 5,296,018 A | * | 3/1994 | Suzuki ................... 55/385.2 X |
| 5,399,319 A | * | 3/1995 | Schoenberger et al. 55/385.2 X |
| 5,451,249 A | * | 9/1995 | Spiegel et al. ............ 96/136 X |
| 5,922,105 A | | 7/1999 | Fujii et al. ..................... 95/63 |

FOREIGN PATENT DOCUMENTS

| DE | 3703137 | * | 8/1988 | .......... B01D/53/00 |
| JP | 59-039019 A | * | 3/1984 | .......... H01L/21/02 |
| JP | 2-048736 | * | 4/1990 | .............. F24F/7/06 |
| JP | 2-120212 | * | 5/1990 | .......... C01B/21/04 |
| JP | 2-126912 | * | 5/1990 | .......... B01D/53/04 |
| JP | 4-243517 | | 8/1992 | |
| JP | 5-96125 | | 4/1993 | |
| JP | 3-341802 | | 6/1993 | |
| JP | 4-180538 | | 1/1994 | |

* cited by examiner

Primary Examiner—Robert H. Spitzer
(74) Attorney, Agent, or Firm—Oblon, Spivak, McClelland, Maier & Neustadt, P.C.

(57) ABSTRACT

A method and apparatus for preventing contamination of a substrate or a substrate surface, and particularly relates to prevention of contamination of raw materials, semi-finished products, base materials of products and substrate surface in a high-tech industry such as in the production of semiconductors and liquid crystals. A gas coming into contact with a base material or substrate is purified by dust removing apparatus and adsorption and/or absorption apparatus so that the concentration of fine particles in the gas is below class 1,000 and a non-methane hydrocarbon concentration is below 0.2 ppm. Thereafter, the base material or the substrate surface is exposed to this gas.

29 Claims, 4 Drawing Sheets

METHOD AND APPARATUS FOR THE PREPARATION OF CLEAN GASES

This application is a continuation of application Ser. No. 08/424,545 filed on Jun. 2, 1995, which was filed as International Application No. PCT/JP92/01579, filed Dec. 2, 1992.

TECHNICAL FIELD

This invention relates to a method and an apparatus or the preparation of clean gases to be brought into contact with substrate surfaces. More specifically, the invention relates to the art of preparation of clean gases for preventing the contamination of the surfaces of substrates as raw materials, semi-finished products and finished products in high-technology industries such as the manufacture of semiconductors and liquid crystals.

The scope of application of the present invention covers, for example: (1) contamination control of wafers in the process of semiconductor manufacture; (2) contamination control of glass substrates in the process of liquid-crystal manufacture; and (3) contamination control of substrates in the process of precision machinery manufacture. Exemplary areas where the method and apparatus of the invention for preparing clean gases can be applied are spaces within cleanrooms in such manufacturing shops as those concerned with semiconductors, liquid crystals and precision machines, as illustrated by safety cabinets, clean boxes, valuables storage spaces, wafer storage spaces, sealed transport spaces for valuables, clean sealed spaces and transport spaces in the presence of various gases or under reduced pressure or in vacuo, spaces containing gases to be supplied to cleaning equipment, and spaces containing air to be supplied to create air knives.

BACKGROUND ART

The prior art technology will now be described with reference to the case of cleaning air in cleanrooms at semiconductor manufacturing shops.

In cleanrooms, fine particles (particulate matter) and gaseous substances such as extremely low concentrations of non-methane hydrocarbons (HCs) in air originating typically from automotive emission gases are of importance as contaminants. In particular, HCs, if present at extremely low concentrations in ordinary air (both inside and outside rooms), will cause contamination as gaseous deleterious components and, hence, need be removed. Various solvents (e.g. alcohols and ketones) that accompany operations performed in cleanrooms are also of importance as contaminants.

Stated more specifically, if the above-mentioned contaminants (fine particulate and gaseous contaminants) deposit on the surfaces of substrates as wafers, semifinished products and finished products, the substrate surfaces are prone to be damaged and this can be a cause of a lower production rate (yield) of semiconductor products; hence, those contaminants have to be removed. Both fine particles and gaseous substances will increase the angle of contact on substrate surfaces and, particularly in cleanrooms, HCs have been found to have a great tendency to increase the angle of contact. The term "angle of contact" as used herein refers to the angle of contact due to wetting by water and indicates the degree of contamination on substrate surfaces. Stated more specifically, when a hydrophobic (oily) substance deposits on a substrate surface, said surface repels water to become less likely to be wetted. Then, the angle of contact between the substrate surface and the drop of water will increase. Therefore, a large angle of contact means a high degree of contamination and, conversely, a small angle of contact means a low degree of contamination.

Conventional methods of cleaning air in cleanrooms or apparatus therefor are roughly classified in two categories:

(1) a mechanical filtering method (e.g. a HEPA filter); and (2) a filtering approach (e.g. HESA filter) that entraps fine particles electrostatically by means of a high-voltage charged or conductive filter. Either of these methods; aims at removing fine particles and is ineffective for removing gaseous contaminants such as non-methane hydrocarbons (HCs) that will increase the angle of contact.

On the other hand, HCs which are gaseous contaminants are known to be removable by such methods as combustion decomposition and $O_3$ decomposition. However, these methods are ineffective for removing extremely low concentrations of HCs present in air to be introduced into cleanrooms.

Gaseous deleterious components other than HCs include SOx, NOx, HCl, $NH_3$, etc. and these are known to be removable by relying either upon neutralization reactions using appropriate alkaline or acidic substances or upon oxidation reactions. However, these methods are also less effective if the concentrations of the components of interest are extremely low as in the case where they are present in air to be introduced into cleanrooms.

The present inventors already proposed methods and apparatus for preventing the contamination of substrate surfaces by using adsorbents or absorbers with a view to preventing the increase in the above-defined angle of contact (Japanese Patent Application Nos. 91/341802 and 92/180538). These methods and apparatus are effective in certain areas of application but further improvements are necessary in order to increase their practical feasibility.

Stated more specifically, particulate matter and gaseous deleterious components that increase the angle of contact must be removed in order to improve the production rate of semiconductor products. Hence, the object of the present invention is to provide a method and an apparatus for preparing clean gases in which the concentrations of fine particles and gaseous deleterious that will increase the angle of contact on substrate surfaces are reasonably low.

DISCLOSURE OF INVENTION

To attain this object, the present invention provides a method for preparing a clean gas that is to be brought into contact with the surface of a substrate for preventing it against contamination, which method comprises reducing the concentration of water in a gas to be treated to 50% (RH) or below by dehumidifying means and thereafter cleaning the gas by dust control means and adsorption and/or absorption means so that the concentration of fine particles in the gas is reduced to class 10 or below whereas the concentrations of non-methane hydrocarbons are reduced to 0.2 ppm or below.

The invention further provides an apparatus for preparing a clean gas that is to be brought into contact with the surface of a substrate for preventing it against contamination, which apparatus has dehumidifying means at the entrance thereof for reducing the concentration of water in a gas to be treated to 50% (RH) or below, as well as dust control means and adsorption and/or absorption means that are located downstream of said dehumidifying means so that the concentration of fine particles in the gas which has been reduced in water concentration to 50% or below is reduced to class 10 or below by said dust control means whereas the concentrations of non-methane hydrocarbons are reduced to 0.2 ppm or below by said adsorption and/or absorption means.

BEST MODE FOR CARRYING OUT THE INVENTION

Figure 1:
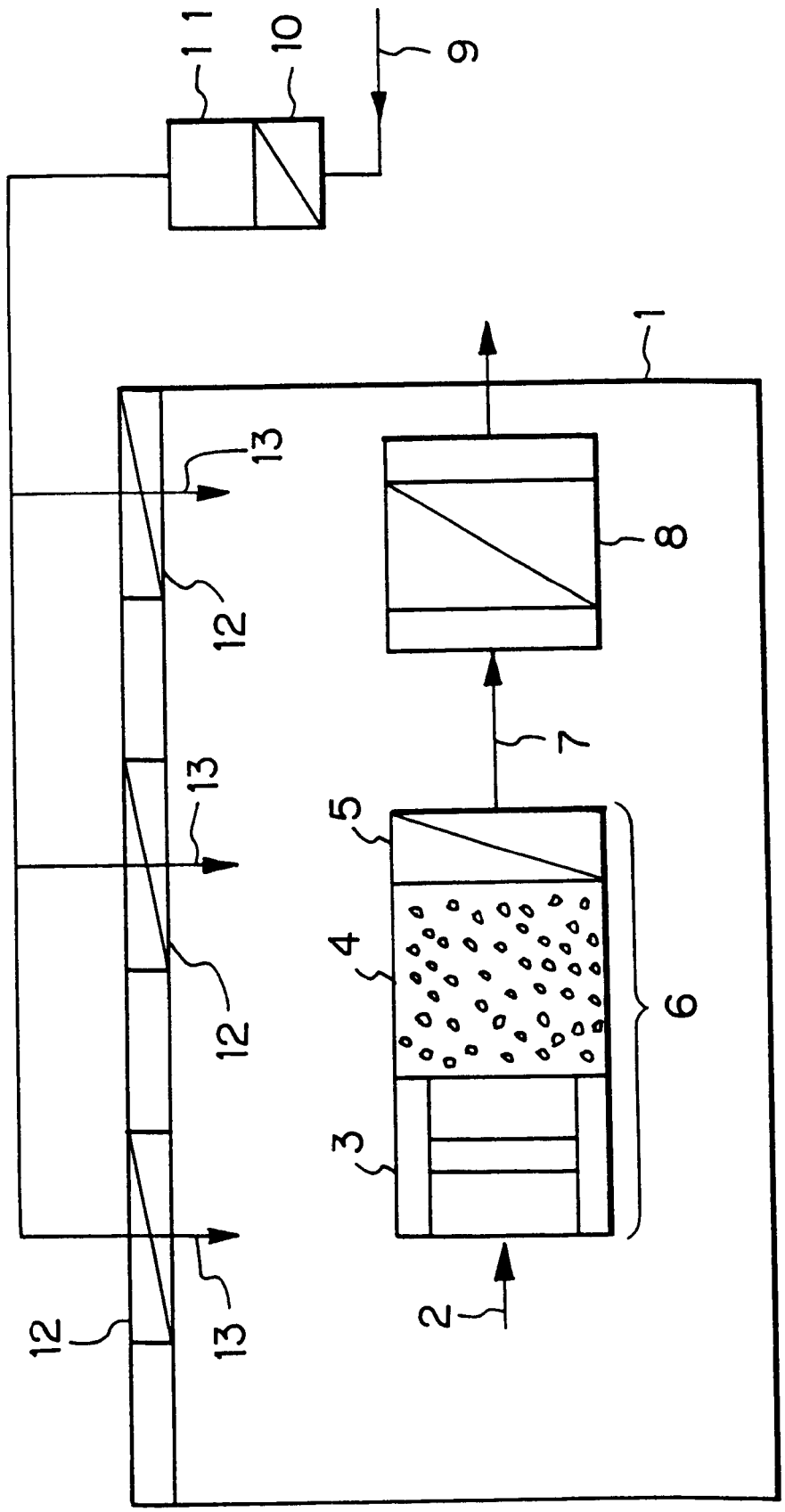
FIG. 1 shows the apparatus of the invention as it is applied to the cleaning of air to be supplied for creating an air knife in a semiconductor manufacturing shop.

The present invention will now be described in detail with reference to the case where the gas in contact with a substrate surface is air.

The dust control means to be used in the invention may be of any type that is capable of removing fine particles in air until their concentration becomes reasonably low. Typically, well-known dust removing filters capable of entrapping fine particles efficiently until their concentrations become reasonably low are employed. Generally, a HEPA filter, an ULPA filter and an electrostatic filter are preferred since they are convenient and yet effective. Typically, these filters are used either individually or in appropriate combinations of two or more types. By removal of fine particles, their concentration is reduced to class 10 (10 particles per cubic foot) or below. The term "class" is a unit of measurement of the concentration of fine particles and represents the number of fine particles contained in one cubic foot.

In order to remove non-methane hydrocarbons, or gaseous deleterious components, materials that adsorb and/or absorb these components which increase the angle of contact are used. Non-methane hydrocarbons will cause contamination at concentrations in ordinary air (both inside and outside rooms). While there are a variety of non-methane hydrocarbons, the specific kinds of components that will increase the angle of contact are believed to vary not only with the type of substrate (e.g. wafer or a glass material) but also with the type and properties of the thin film on the substrate. As a result of the intensive studies they conducted, the present inventors found that non-methane hydrocarbons as an indicator could effectively be removed by reducing their concentrations to 0.2 ppm and below, preferably 0.1 ppm and below.

Exemplary adsorbents that may be used include activated charcoal, silica gel, synthetic zeolite, molecular sieves, high-molecular weight compounds (e.g. styrenic polymers and styrene-divinylbenzene copolymers), glass, fluorochemicals, metals, etc.

Common examples of glass materials are oxide glass systems such as silicate glasses and phosphate glasses. A particularly preferred silicate glass is a borosilicate glass (chiefly composed of $N_2O$—$B_2O_3$—$SiO_2$) since this is easy to mold, has high adsorption effect and yet is inexpensive. A higher adsorption effect is achieved if the glass surface is coated with thin films of metals such as Ti, Au, Al, Cr, etc.

Exemplary fluorochemicals include tetrafluoroplastics, tetra-hexafluoroplastics, PFA resins, trifluoroethylene resins, tetrafluoroethylene-ethylene copolymers, vinylidene fluoride resins, vinyl fluoride resins, graphite fluoride, TEFLON, etc.

Glass and fluorochemicals may be used in various forms including filters, fibers, meshes, spheres, pellets, lattices, rods, pleats, etc. Filters are generally preferred since they provide great adsorption effect. When they are to be used in the form of a filter, molding may be performed by using resins of fluorochemicals as binders, in which glass materials in a fibrous form are set in a filter form. Use of such a filter form adds dust control performance to the HC removal performance, thereby contributing to the making of a simplified filter design. Therefore, assembling adsorbents of such a design into contamination control equipment is preferred depending on the area of utility, the size of equipment and its geometry.

Exemplary metals include Fe, Ag, Ni, Cr, Ti, Au, Pt, etc., and various forms including powders, plates, sponges, wires, fibers, as well as attachments to suitable carriers, for example, Ag carried on a silica-alumina gel and Ag carried on zirconium phosphate may be used with advantage.

Among the adsorbents described above, silica gel, synthetic zeolite, high-molecular weight compounds, glass, fluorochemicals and metals are more preferred since they exhibit higher adsorption effects. These adsorbents may be used either individually or in appropriate combinations of two or more kinds (see Japanese Patent Application Nos. 91/341802 and 92/180538). As will be mentioned hereinafter, a plurality of HCs are believed to be responsible for increased angles of contact and, hence, longer lives are realized by using two or more kinds of adsorbents in combination. In other words, a single kind of adsorbent is usually limited in its ability to trap all HCs that are responsible for increased angles of contact and, hence, it is effective to use adsorbents of different adsorption characteristics in appropriate combinations on the basis of experimentation.

Additionally, depending on the type of glass substrate or its surface condition, HCs will affect by different degrees and, hence, advantageous adsorbents may be selected from the above-listed candidates based on preliminary tests conducted as appropriate for the specific area of utility, the scale of equipment, its shape, the conditions for using the equipment, shared gas, the requisite performance, economy, etc.

In the present invention, the air to be treated is subjected to dehydration, dehumidification or reduction in humidity before the air is passed through the adsorbent and this is effective in improving the adsorption performance of the adsorbent and extending its life. To this end, any well-known techniques may be employed such as those relying upon cooling, adsorption, absorption, compression or membrane separation, and these can be used either singly or in appropriate combinations of two or more methods based on preliminary tests conducted as appropriate for the specific area of application of the apparatus of the invention, its scale, shape, the conditions for its use (such as whether it is used under atmospheric or superatmospheric pressure). It is preferred to adopt a dehumidifying technique that will maintain the intended dehumidifying performance consistently over a prolonged period typically ranging from several months to half a year or even longer. Those techniques which rely upon cooling and/or adsorption are particularly convenient and yet effective. The techniques relying upon cooling are preferably operated either electronically to achieve dehumidification or by means of a cooling coil; the techniques relying upon adsorption are preferably of such a type that dehumidification is carried out continuously for a prolonged period as the dehumidifier per se is regenerated (as in a stationary or rotary type). Exemplary materials for use in dehumidification by adsorption techniques include silica gel, zeolite, activated charcoal, activated alumina, magnesium perchlorate, calcium chloride, etc. Among these, silica gel and zeolite are preferred since they have the ability to remove HCs, are recyclable and can be used for a prolonged time.

If the gas to be treated is dehumidified until the water concentration is 50% (RH, or relative humidity) or less, preferably 30% (RH) or less, the performance of adsorbents in adsorbing HCs is not only improved but also maintained consistently for a prolonged time. A specific technique of dehumidification and the critical water concentration can be determined by conducting a preliminary test as appropriate for the type of the apparatus applied, its scale, the type of HC removing material, the requisite performance, economy, etc.

Dehumidification assures that the performance of adsorbents in removing HCs is maintained consistently for a prolonged time. Particularly in the case where hydrophobic substances such as silica gel and fluorochemicals are used as adsorbents, their performance is markedly stabilized by dehumidification.

The use of adsorbents is in no way limited to the above-described method of use (which is accompanied by dehumidification); if desired, the adsorbents may be used as they are regenerated simultaneously by PSA (pressure-swing adsorption) or TSA (thermal swing adsorption).

Any kind of HC absorbers may be used as long as they can react with low concentrations of HCs to fix them. Generally, the reaction with $Cr^{6+}$ in the presence of $H_2SO_4$ or the reaction with $I_2O_5$ in the presence of $H_2S_2O_7$ may be employed. The former type of reaction is effective for HCs of the lower molecular weights and the latter type of reaction is effective for HCs of the higher molecular weights. For example, glass beads or carriers such as zeolite and alumina that are in appropriate shapes (e.g. pellets) are used as their surfaces are impregnated with aqueous salt solutions containing hexavalent chromium that have been rendered acidic with $H_2SO_4$. The term "absorption" refers to reactive absorption due to chemical reactions.

The specific conditions for the use of adsorbents and/or absorbers can be determined by conducting a preliminary test as appropriate for the area of application of the apparatus of the invention, its scale, shape, the requisite performance, etc. The space velocity (SV) of the air being treated in the apparatus is typically set between 100 and 20,000 $h^{-1}$, preferably between 100 and 5,000 $h^{-1}$.

The foregoing description concerns an embodiment of the present invention as it is applied to the removal of extremely low concentrations of HCs from ordinary air. Generally, the causative substances that contaminate substrate surfaces, thereby increasing the angle of contact are roughly divided into (1) deleterious gases such as SOx, NOx, HCl and $NH_3$, (2) fine particles, and (3) HCs. As a result of the review by the present inventors, fine particles and HCs considerably affect the angle of contact in ordinary air (ambient atmosphere in ordinary cleanrooms) or in $N_2$ which is used in cleanrooms at semiconductor or liquid-crystal manufacturing shops. In other words, SOx, NOx, HCl and $NH_3$, if they are present at ordinary concentration levels in air, are generally less influential on the increase in the angle of contact. Therefore, the intended effect is achieved by dust control and the removal of HCs. However, when deleterious gases such as SOx are generated in a cleanroom or nearby areas and if their concentrations are high, the angle of contact is affected by these gaseous components; even if their concentrations are so low that they are not normally expected to cause any serious effects, the angle of contact can potentially be influenced if the substrate is sensitive or if its surface is in a special state (as when the substrate surface is coated with a special thin film). In such cases, the method or apparatus of the invention is preferably used in appropriate combination with a method (and apparatus) that have already been proposed by the present inventors (in Japanese Patent Application No. 91/22686) and which are characterized by illuminating a deleterious gas with uv light and/or radiations to reduce the gas to fine particles and then trapping these fine particles. In this case, other well-known materials for removing deleterious gases such as activated charcoal and ion-exchange resins may be used in appropriate combinations with the method or apparatus of the invention. Activated charcoal may be film plated with acids or alkalies or modified appropriately by well-known methods.

Additionally, to attain the object of removing HCs, a method that has already been proposed by the present inventors (in Japanese Patent Application No. 91/105092) and which is characterized by reducing HCs to fine particles under illumination with uv light and/or radiations and then trapping these fine particles.

FIG. 1 shows the method of the invention as it is applied to the cleaning of air to be supplied for creating an air knife in a semiconductor manufacturing shop. Referring to FIG. 1, numeral 1 designates a class 10,000 cleanroom and air 2 is treated within the cleanroom 1 by means of a gas preparing apparatus 6 comprising a dehumidifier 3, an adsorbent 4 for adsorbing gaseous deleterious components (chiefly HC in the case under consideration) that will increase the angle of contact, and a dust removing filter 5. Air 7 emerging from the apparatus 6 is clean air that is free not only from dust but also from the gaseous deleterious components and it is subsequently supplied to air-knife equipment 8 for cleaning wafers (substrates).

The case will now be described in detail. Outside air 9 before entering the cleanroom 1 is first treated with a prefilter 10 and an air conditioner 11. The air is then deprived of dust particles by means of HEPA filters 12 as it enters the cleanroom 1, thereby producing air 13 with a class 10,000 concentration that also contains extremely low concentrations of HCs. Thus, the extremely low concentrations of HCs which mainly originate from automobiles are not removed by means of the prefilter 10, air conditioner 11 or HEPA filters 12 but are simply introduced into the cleanroom 1. The concentrations of HCs in air 13 range from 0.5 to 0.8 ppm in terms of non-methane HCs.

Air 2 within the cleanroom 1 which contains water (RH of 40–60%), fine particles (of class 10,000) and extremely low concentrations of HCs is first dehumidified by means of a dehumidifier (dehumidifying apparatus) 3 so that the water content is below a specified concentration. The dehumidifier used in the case under consideration is electronically operated so that the above-stated humidity (RH of 40–60%) in the cleanroom 1 is reduced to 30% or below.

The dehumidified air is then treated with the HC adsorbent or gas adsorbing/removing apparatus 4, whereby the extremely low concentrations of HCs are removed. The HC adsorbent 4 may be of any type that is capable of removing the extremely low concentrations of HCs in ordinary atmospheric air. In the case under consideration, silica gel is used as adsorbent 4, whereby the non-methane HCs in the air are removed so that their concentrations are 0.1 ppm. If the introduced air 2 has a high water content, silica gel will also adsorb water and deteriorate in performance; hence, the water content of the air is removed preliminarily by means of the dehumidifier 3 in the manner described above.

Subsequently, the fine particles in the air are removed by means of dust removing filter (dust control apparatus) 5. The dust removing filter 5 may be positioned either upstream of the HC adsorbent 4 or, as in the case under consideration, downstream of the HC adsorbent 4 or in both locations. However, to ensure safety in an assumed case where fine particles might flow out of the adsorbent 4, it is usually preferred to have at least one dust removing filter located downstream of the HC adsorbent 4 as in the case under consideration. The dust removing filter 5 may be of any type that is capable of efficient trapping of fine particles present at a concentration of class 10,000 within the cleanroom 1 and those fine particles which will flow out of the adsorber. An ULPA filter is used in the case under consideration. The ULPA filter will remove fine particles until a concentration of class 10 or below is achieved.

In the case under consideration, HCs are removed by means of the adsorbent but this may be replaced by an absorber (a reagent that reacts with extremely low concentrations of HCs). If desired, both the adsorbent and the absorber may be used.

The methods (and apparatus) that have already been proposed by the present inventors as described hereinabove may appropriately be combined with the method of the invention; additionally, materials for removing deleterious gases other than HCs may be used or combined with themselves on the basis of proper selections. It should also be mentioned that the conditions for using the dust removing filter, as well as the adsorbent and/or absorber may be determined appropriately; namely, those conditions can be determined by a preliminary test that is conducted as appropriate for the concentrations of contaminants (fine particles, HCs and other deleterious gases) within the cleanroom to be used, their kinds, the type of the applicable equipment, its construction, scale, the requisite performance, efficiency, economy, etc.

While an example of the invention has been described above with particular reference to the case where the medium is air, it goes without saying that the invention is equally applicable to the case where fine particles and gaseous deleterious substances are contained in other gases such as nitrogen and argon.

The space in which the invention is applicable covers not only the atmospheric space described above but also superatmospheric, subatmospheric and vacuum spaces and the invention is equally applicable in these spaces.

The HC components in air are said to be mixtures of more than several hundred or several thousand species and it is not clear which of those many species of HC components will be responsible by how much degrees to the increase in the angle of contact. Such being the case, details of the mechanism by which the adsorbent and/or absorber prevents the increase in the angle of contact remain unclear in many points but the following explanation may be postulated: among the many HC components, those substances having high molecular weights or highly active substances are estimated to have particularly great effects on the increase in the angle of contact and these substances are effectively adsorbed and trapped by means of the adsorbent and the absorber.

EXAMPLE 1

Water, fine particles and HCs were removed from the air within a cleanroom by means of an apparatus having the construction shown in FIG. 1. Glass substrate were exposed to the thus obtained clean air and the angle of contact was measured. The concentration of fine particles and the concentrations of non-methane HCs were measured at the exit from the gas preparing apparatus. The concentration of water was also measured at the exit from the dehumidifier. Contact angle measurements were conducted on the apparatus shown in FIG. 1, except that the dehumidifier was dismounted, both the dehumidifier and the HC adsorbent were dismounted (in other words, only the dust removing filter was operational), and both the dehumidifier and the dust removing filter were dismounted (in other words, only the HC adsorbent was operational). Additionally, contact angle measurements were conducted for the case where glass substrates were exposed to the untreated air in the cleanroom.

| Test Conditions: | |
|---|---|
| Concentration of water in the cleanroom before treatment: | 40–60% |
| Concentration of fine particles in the cleanroom before treatment: | class 10,000 |
| Concentration of non-methane HCs in the cleanroom before treatment: | 0.51 ppm |
| Dehumidifier: | Electronic dehumidifier (operating on the Peltier effect) (product of Shinei Sangyo K.K.) |
| Dust removing filter: | ULPA (Gas Clean Filter SGLF 6101 of Nihon Pall Ltd.) |
| HC adsorbent: | Silica gel (medium-size particle; SV, 1,000 $h^{-1}$) (product of Wako Pure Chemical Industries, Ltd.) |
| Contact angle meter: | Model CA-D contact-angle meter of Kyowa Interface Science Co., Ltd. |
| Water content meter: | Electronic humidity sensor |
| Pretreatment of glass substrate: | Washing with detergent and alcohol, followed by illumination with uv light under $O_3$ generation. |

Figure 2:
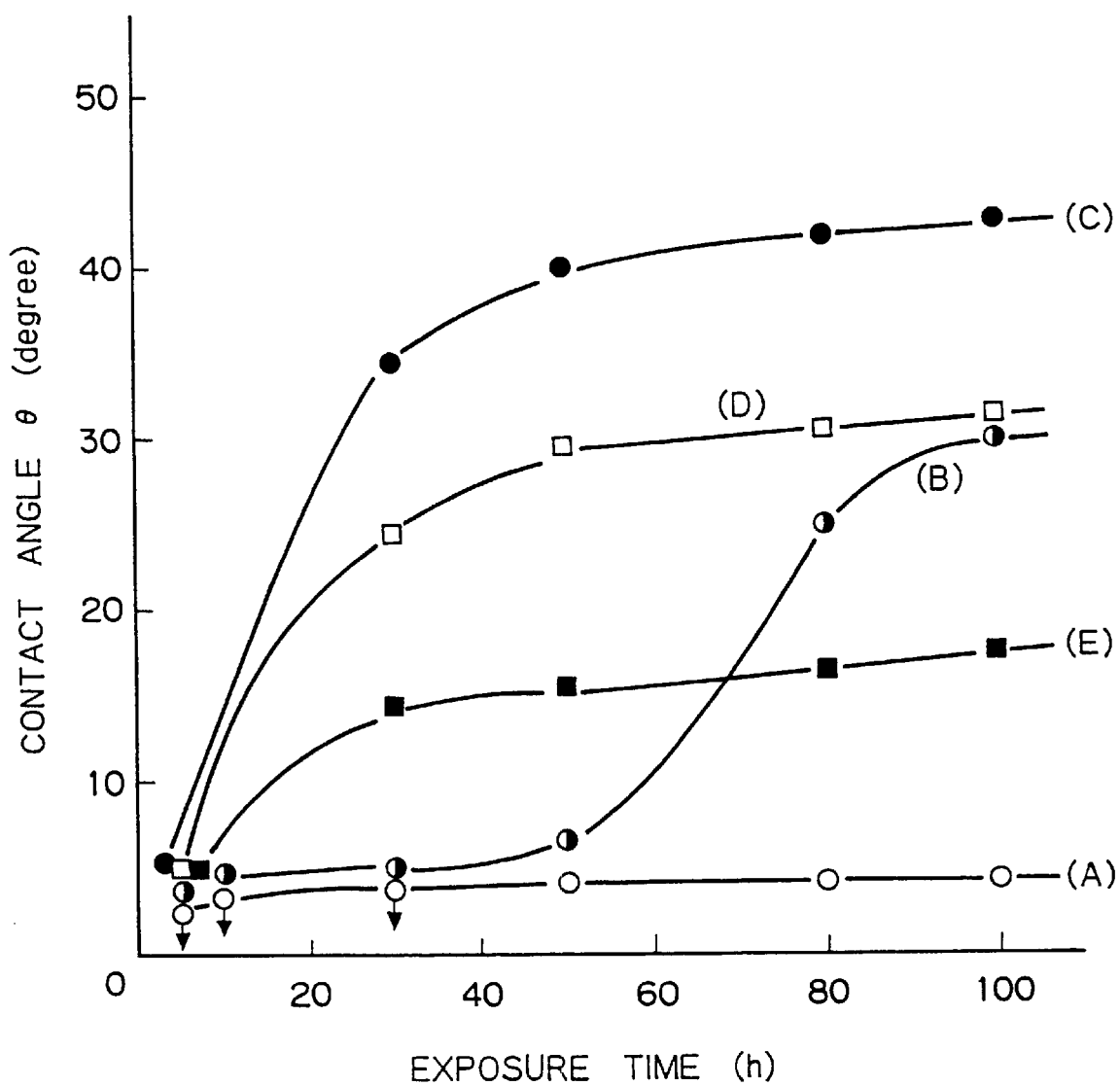
FIGS. 2, 3 and 4 are graphs showing the relationships between the time of exposure of a glass substrate or a wafer to air and the measured angle of contact $\theta$.

The relationships between the times of air exposure of glass substrates and the measured angles of contact θ are shown in FIG. 2, in which: the relationship for a system of the present invention (A) (which used the dehumidifier, dust removing filter and silica gel) is indicated by -○-; and the relationship for a comparison (B) where the dehumidifier was dismounted from the system of the invention (A) is indicated by -◓-. FIG. 2 also shows the relationships for three comparisons: (C) the case of exposure to the untreated air in the cleanroom (-●-); (D) the case of exposure to the air that was solely passed through the dust removing filter (-□-); and (E) the case of exposure to the air that was solely passed through the HC adsorbent (-■-).

The degree below which the angle of contact could not be detected with the contact angle meter used (the lower limit for the detection of contact angle) was 3 to 4 degrees and, in the case of the invention which used the dehumidifier, dust removing filter and silica gel altogether, the contact angle meter showed detection limits (↓) at the early stage. The concentration of fine particles at the exit from the invention apparatus (A) was class 10 and below (as measured with a light scattering particle counter), and the concentrations of non-methane HCs were 0.1 ppm and below (as measured with a gas chromatograph). The concentration of water at the exit from the dehumidifier was 25–30%.

EXAMPLE 2

Synthetic zeolite, a high-molecular weight compound (styrenic polymer), a fluorine powder and graphite fluoride were used as adsorbents. The other process conditions were the same as the system of the invention (A) in Example 1, and the angle of contact was measured at 15, 40 and 100 h. The results are shown in Table 1.

TABLE 1

|  | 15 h | 40 h | 100 h |
|---|---|---|---|
| Synthetic zeolite | <4 | 5 | 15 |
| High-molecular weight compound | <4 | <4 | 12 |
| Fluorine powder | <4 | <4 | 6 |
| Graphite fluoride | <4 | <4 | <4 |

EXAMPLE 3

Water, fine particles and HCs were removed from the air within a cleanroom by means of an apparatus having the construction shown in FIG. 1. In the cleanroom, acid cleaning had been done using nitric acid and sulfuric acid and the air in that cleanroom contained 10–50 ppm of NOx and SOx. Wafers were exposed to the thus obtained clean air and the angle of contact was measured. The concentration of fine particles and the concentrations of non-methane HCs were measured at the exit from the gas preparing apparatus of the invention. The concentration of water was also measured at the exit from the dehumidifier. Additionally, contact angle measurements were conducted on comparative apparatuses and for the case where wafers were exposed to the untreated air in the cleanroom.

| Test Conditions: | |
|---|---|
| Concentration of water in the cleanroom before treatment: | 40–60% |
| Concentration of fine particles in the cleanroom before treatment: | class 10,000 |
| Concentration of non-methane HCs in the cleanroom before treatment: | 0.82 ppm |
| Dehumidifier: | Electronic dehumidifier (operating on the Peltier effect) (product of Shinei Sangyo K.K.) |
| Dust removing filter: | ULPA (Gas Clean Filter SGLF 6101 of Nihon Pall Ltd.) |
| Adsorbents: | (1) Silica gel (medium-size particle; SV, 1,000 h$^{-1}$) (product of Wako Pure Chemical Industries, Ltd.) |
| | (2) Active charcoal film-plated with alkali (for adsorption of NOx and SOx; SV, 1,000 h$^{-1}$) (product of Tsurumi Coal K.K.) mounted downstream of silica gel (1) |
| Contact angle meter: | CA-D Model contact-angle meter of Kyowa Interface Science Co., Ltd. |
| Water content meter: | Electronic humidity sensor |

Figure 3:
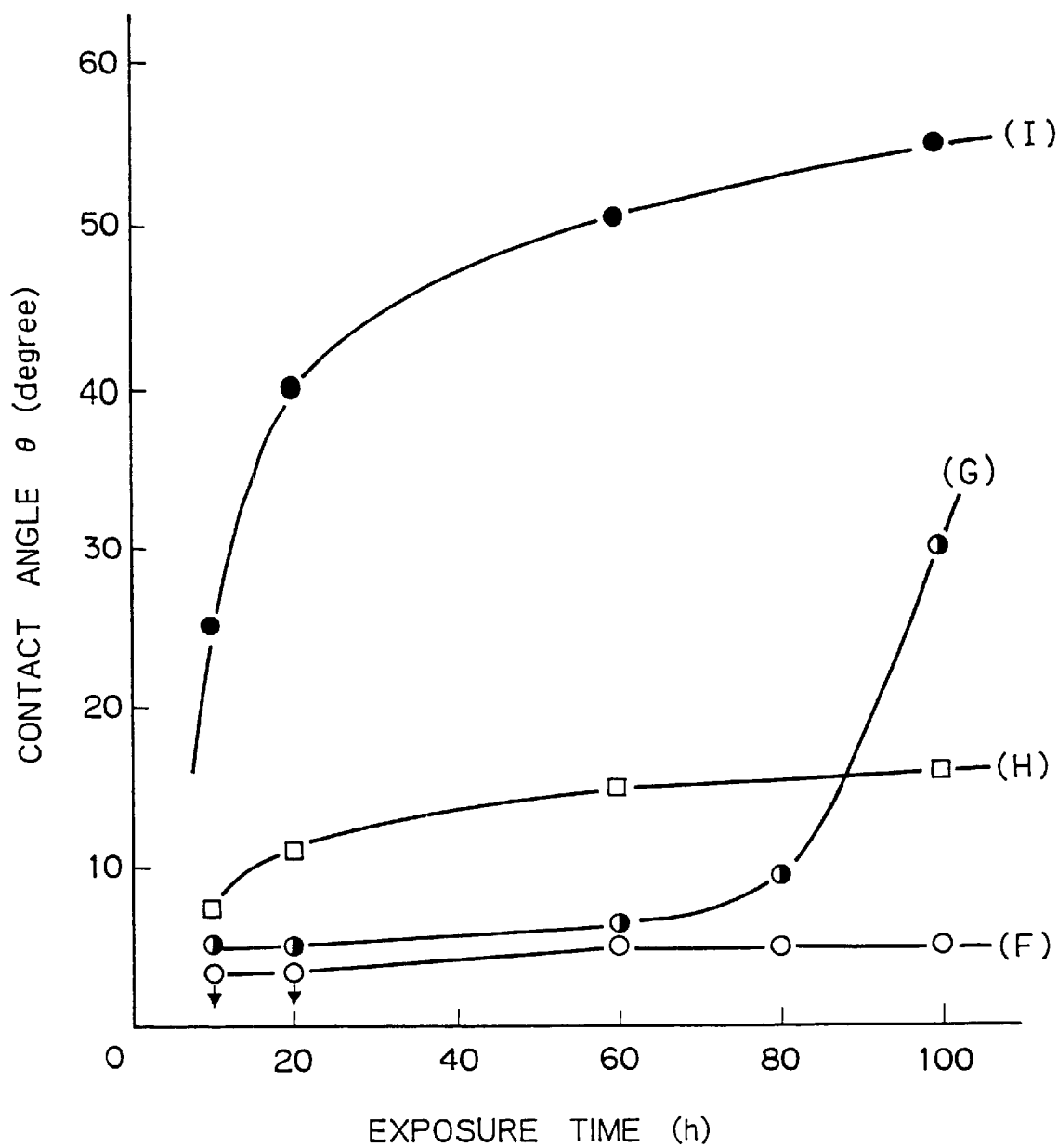

The relationships between the times of air exposure of wafers and the measured angles of contact θ are shown in FIG. 3, in which: the relationship for a system of the present invention (F) [which used the dehumidifier, dust removing filter and adsorbent (2)] is indicated by -○-; the relationship for a comparison (G) where the dehumidifier was dismounted from the system of the invention (F) is indicated by -◑-; and the relationship for another system of the invention (H) [which used the dehumidifier, dust removing filter and adsorbent (1)] is indicated by -□-. The relationship for another comparison (I), or the case of exposure to the untreated air in the cleanroom, is indicated by -●- in FIG. 3.

The concentrations of fine particles at the exit from the invention apparatus (F) and (H) were class 10 and below, and the concentrations of non-methane HCs were 0.1 ppm and below. The concentration of water at the exit from the dehumidifier was 30–35%.

EXAMPLE 4

Water, fine particles and HCs were removed from the air within a cleanroom by means of an apparatus having the same construction as shown in FIG. 1 (except that the dust removing filter and the adsorbent were changed to the materials stated below). Glass substrates were exposed to the thus obtained clean air and the angle of contact was measured. The concentration of fine particles and the concentrations of non-methane HCs were measured at the exit from the gas preparing apparatus of the invention. The concentration of water was also measured at the exit from the dehumidifier. Contact angle measurements were also conducted on the apparatus shown in FIG. 1 except that the dehumidifier was dismounted, as well as for the case where glass substrates were exposed to the untreated air in the cleanroom.

| Test Conditions: | |
|---|---|
| Concentration of water in the cleanroom before treatment: | 40–60% |
| Concentration of fine particles in the cleanroom before treatment: | class 10,000 |
| Concentration of non-methane HCs in the cleanroom before treatment: | 0.64 ppm |
| Dehumidifier: | Electronic dehumidifier (operating on the Peltier effect) (product of Shinei Sangyo K.K.) |
| HC adsorbents: | Silica gel (medium-size particle; SV, 1,000 h$^{-1}$) (product of Wako Pure Chemical Industries, Ltd.) and fibrous borosilicate |

-continued

Test Conditions:

| | |
|---|---|
| | glass that was molded into a filter shape using a tetrafluoroplastic binder and which was mounted downstream of the silica gel; SV of the filter was 10,000 h$^{-1}$. |
| Dust removing filter: | It's function was served by the fibrous borosilicate glass that was molded into a filter shape in the manner just described above. |
| Contact angle meter: | Model CA-D contact-angle meter of Kyowa Interface Science Co., Ltd. |
| Water content meter: | Electronic humidity sensor |
| Pretreatment of glass substrates: | Washing with detergent and alcohol, followed by illumination with uv light under O$_3$ generation. |

Figure 4:
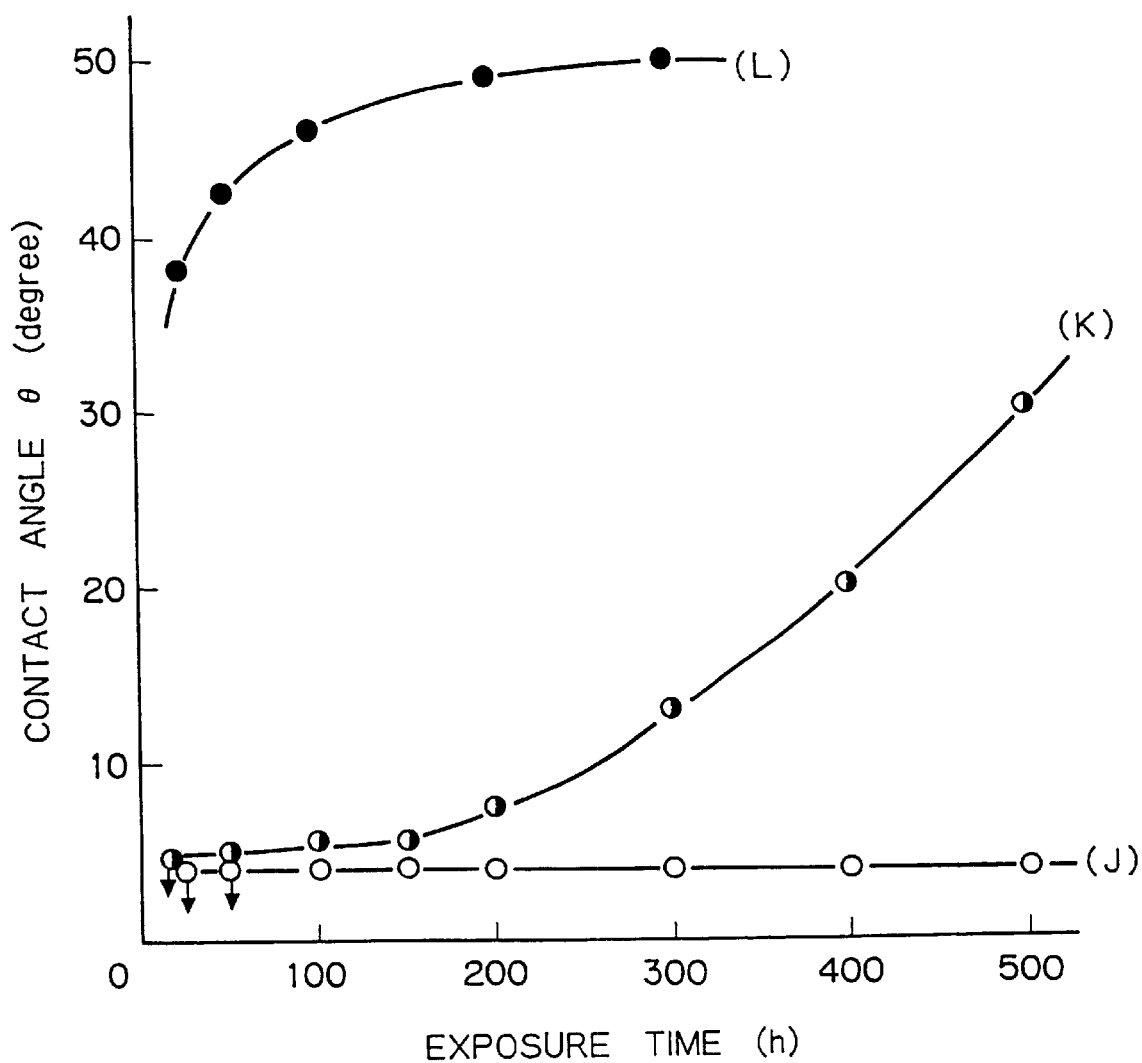

The relationships between the times of air exposure of glass substrates and the measured angles of contact e are shown in FIG. 4, in which: the relationship for a system of the present invention (J) (which used the dehumidifier, dust removing filter and HC adsorbent) is indicated by -○-; and the relationship for a comparison (K) where the dehumidifier was dismounted from the system of the invention (J) is indicated by -◑- The relationship for another comparison (L), or the case of exposure to the untreated air in the cleanroom, is indicated by -●- in FIG. 4.

The concentration of fine particles at the exit from the invention apparatus (J) was class 10 and below, and the concentrations of non-methane HCs were 0.1 ppm and below. The concentration of water at the exit from the dehumidifier was 25–30%.

The present invention offers the following advantages.

According to the method of the invention, fine particles in a gas of interest are removed while, at the same time, hydrocarbons are adsorbed and/or absorbed, thereby producing a clean gas. If substrates for semiconductors and liquid crystals are exposed to the clean gas, their surfaces are protected from contamination.

If the gas to be treated contains NOx, SOx and other gaseous deleterious components at high concentrations, a suitable method for removing these deleterious components (such as one of the methods already proposed by the present inventors) is selected and combined with the hydrocarbon adsorbent and/or absorber that are specified in the present invention; as a result, more effective contamination control is accomplished.

Additionally, the removal of hydrocarbons is preceded by dehumidification of the air to be treated so that the water content is reduced to below a certain concentration, whereby the performance of the adsorbent in removing hydrocarbons is maintained consistently over a prolonged period. As a result, the frequency of replacements of the adsorbent is reduced and its practical feasibility is enhanced.

What is claimed is:

1. A method for preventing contamination of a substrate or substrate surface, said method comprising the following in sequence:
    passing a gas containing non-methane hydrocarbons through an adsorber and/or absorber for decreasing concentrations of non-methane hydrocarbons therein;
    passing the gas through a first filter for removing fine particles therein; and
    bringing the gas into contact with a substrate or substrate surface to prevent contamination of the substrate.

2. The method of claim 1, wherein the adsorber and/or absorber decreases concentrations of non-methane hydrocarbons to not more than 0.2 ppm.

3. The method of claim 2, wherein the adsorber and/or absorber decreases concentrations of non-methane hydrocarbons to not more than 0.1 ppm.

4. The method of claim 1, wherein the first filter removes fine particles in the gas to the extent of class 10 or below.

5. The method of claim 1, wherein the first filter comprises at least one of a HEPA filter, an ULPA filter and an electrostatic filter.

6. The method of claim 1, wherein said adsorber and/or absorber comprises at least one of activated charcoal, silica gel, synthetic zeolite, molecular sieves, a polymer material, glass, fluorochemicals and metals.

7. The method of claim 1, wherein the adsorber and/or absorber acts by adsorbing and/or by absorbing non-methane hydrocarbons that increase the angle of contact with said substrate or substrate surface.

8. A method for preventing contamination of a substrate or substrate surface, said method comprising the following in sequence:
    passing a gas containing non-methane hydrocarbons through an adsorber and/or absorber, being disposed in a housing, for decreasing concentrations of non-methane hydrocarbons therein; and
    bringing the gas into contact with a substrate or substrate surface, being disposed in the housing, to prevent contamination of the substrate.

9. The method of claim 8, wherein the adsorber and/or absorber acts by adsorbing and/or by absorbing non-methane hydrocarbons that increase the angle of contact with said substrate or substrate surface.

10. A method of reducing the contact angle which a gas makes with a substrate or substrate surface, said method comprising the following in sequence:
    passing a gas containing non-methane hydrocarbons that increase the angle of contact with said substrate or substrate surface through an adsorber and/or absorber, being disposed in a housing, for preventing said increase of contact angle; and
    bringing the gas into contact with said substrate or substrate surface, being disposed in the housing.

11. An apparatus for preventing contamination of a substrate or substrate surface, which comprises:
    an adsorber and/or absorber for decreasing concentrations of non-methane hydrocarbons in a gas; and
    a filter, being disposed downstream of the adsorber and/or absorber, for removing fine particles in the gas; and
    a holder, being disposed downstream of the filter, for holding a substrate.

12. The apparatus of claim 11, further comprising a housing wherein the adsorber and/or absorber and the filter are disposed in the housing.

13. The apparatus of claim 11, wherein the adsorber and/or absorber is capable of decreasing concentrations of non-methane hydrocarbons to not more than 0.2 ppm.

14. The apparatus of claim 13, wherein the adsorber and/or absorber is capable of decreasing concentrations of non-methane hydrocarbons to not more than 0.1 ppm.

15. The apparatus of claim 11, wherein the filter is capable of removing fine particles in the gas to the extent of class 10 or below.

16. The apparatus of claim 11, wherein the filter comprises at least one of a HEPA filter, an ULPA filter and an electrostatic filter.

17. The apparatus of claim 11, wherein said adsorber and/or absorber comprises at least one of activated charcoal, silica gel, synthetic zeolite, molecular sieves, a polymer material, glass, fluorochemicals and metals.

18. The apparatus of claim 11, wherein the adsorber and/or absorber acts by adsorbing and/or by absorbing non-methane hydrocarbons that increase the angle of contact with said substrate or substrate surface.

19. A cleanbox for preventing contamination of a wafer retained therein, which comprises:
   an adsorber and/or absorber for decreasing concentrations of non-methane hydrocarbons in a gas; and
   a filter, being disposed downstream of the adsorber and/or absorber, for removing fine particles in the gas; and
   a holder, being disposed downstream of the filter, for holding a wafer.

20. The clean box of claim 19, further comprising a housing wherein the adsorber and/or absorber and the filter are disposed in the housing.

21. The clean box of claim 19, wherein the adsorber and/or absorber is capable of decreasing concentrations of non-methane hydrocarbons to not more than 0.2 ppm.

22. The clean box of claim 21, wherein the adsorber and/or absorber is capable of decreasing concentrations of non-methane hydrocarbons to not more than 0.1 ppm.

23. The clean box of claim 19, wherein the filter is capable of removing fine particles in the gas to the extent of class 10 or below.

24. The clean box of claim 19, wherein the filter comprises at least one of a HEPA filter, an ULPA filter and an electrostatic filter.

25. The clean box of claim 19, wherein said adsorber and/or absorber comprises at least one of activated charcoal, silica gel, synthetic zeolite, molecular sieves, a polymer material, glass, fluorochemicals and metals.

26. The clean box of claim 19, wherein the adsorber and/or absorber acts by adsorbing and/or by absorbing non-methane hydrocarbons that increase the angle of contact with said substrate or substrate surface.

27. An apparatus for preventing contamination of a substrate or substrate surface, which comprises:
   a housing;
   an adsorber and/or absorber, being disposed in the housing, for decreasing concentrations of non-methane hydrocarbons in a gas containing non-methane hydrocarbons; and
   a holder, being disposed in the housing, for holding a substrate.

28. The apparatus of claim 27, wherein the adsorber and/or absorber acts by adsorbing and/or by absorbing non-methane hydrocarbons that increase the angle of contact with said substrate or substrate surface.

29. An apparatus for reducing the contact angle which a gas makes with a substrate or substrate surface, which comprises:
   a housing;
   an adsorber and/or absorber, being disposed in the housing, for preventing said increase of contact angle; and
   a holder, being disposed in the housing, for holding a substrate.

* * * * *

UNITED STATES PATENT AND TRADEMARK OFFICE
CERTIFICATE OF CORRECTION

PATENT NO. : 6,340,381 B1
DATED : January 22, 2002
INVENTOR(S) : Fujii et al.

It is certified that error appears in the above-identified patent and that said Letters Patent is hereby corrected as shown below:

<u>Title page,</u>
Item [30], Foreign Application Priority information should be deleted.

Signed and Sealed this

Twenty-fifth Day of June, 2002

*Attest:*

*Attesting Officer*

JAMES E. ROGAN
*Director of the United States Patent and Trademark Office*